(12) United States Patent
Fukuda et al.

(10) Patent No.: US 8,023,082 B2
(45) Date of Patent: Sep. 20, 2011

(54) LIQUID CRYSTAL DISPLAY DEVICE

(75) Inventors: Koichi Fukuda, Mobara (JP); Tetsuya Oshima, Mobara (JP); Satoru Kawasaki, Mobara (JP); Tsutomu Sato, Mobara (JP); Kouji Hayakawa, Chousei (JP)

(73) Assignee: Hitachi Displays, Ltd., Chiba (JP)

( * ) Notice: Subject to any disclaimer, the term of this patent is extended or adjusted under 35 U.S.C. 154(b) by 127 days.

(21) Appl. No.: 12/184,270

(22) Filed: Aug. 1, 2008

(65) Prior Publication Data

US 2009/0033852 A1    Feb. 5, 2009

(30) Foreign Application Priority Data

Aug. 2, 2007 (JP) ................................. 2007-201707

(51) Int. Cl.
  *G02F 1/1333* (2006.01)
(52) U.S. Cl. ........................................................ 349/122
(58) Field of Classification Search ........................ None
  See application file for complete search history.

(56) References Cited

U.S. PATENT DOCUMENTS

| 5,793,461 A | 8/1998 | Inou |
| 6,897,922 B2 * | 5/2005 | Ikeno et al. ............... 349/113 |
| 2003/0112213 A1 * | 6/2003 | Noguchi et al. ............ 345/96 |
| 2003/0169585 A1 * | 9/2003 | Okuwaki ..................... 362/31 |
| 2006/0125994 A1 * | 6/2006 | Hoshino et al. ............. 349/149 |
| 2007/0165170 A1 | 7/2007 | Fukuda |
| 2007/0222912 A1 | 9/2007 | Sato et al. |
| 2007/0229953 A1 * | 10/2007 | Chen et al. ................. 359/485 |

FOREIGN PATENT DOCUMENTS

| JP | 4-124601 | 4/1992 |
| JP | 08-006039 | 1/1996 |
| JP | 10-73836 | 3/1998 |
| JP | 2003-195043 | 7/2003 |
| JP | 2004170804 A * | 6/2004 |
| JP | 2005-222397 | 8/2005 |
| JP | 2008-299175 | 12/2008 |

\* cited by examiner

*Primary Examiner* — Mark Robinson
*Assistant Examiner* — Mary El Shammaa
(74) *Attorney, Agent, or Firm* — Antonelli, Terry, Stout & Kraus, LLP.

(57) ABSTRACT

A liquid crystal display device includes: a first substrate; a second substrate which is placed nearer to a viewer than the first substrate, and which faces a viewer side of the first substrate; a liquid crystal sandwiched between the first substrate and the second substrate; an upper polarization plate which is placed nearer to the viewer than the second substrate, and which faces a viewer side of the second substrate; and a transparent resin plate which is placed nearer to the viewer than the upper polarization plate, and which is attached to a viewer side of the upper polarization plate with one of an adhesive material and a bonding material, the transparent resin plate includes a transparent oxide film on a face that faces the upper polarization plate, and the transparent resin plate is in close contact with the adhesive material or the bonding material through the transparent oxide film.

10 Claims, 10 Drawing Sheets

102  104  C'  DA

LIQUID CRYSTAL DISPLAY DEVICE

CROSS-REFERENCE TO RELATED APPLICATION

The present application claims priority from Japanese application JP 2007-201707 filed on Aug. 2, 2007, the content of which is hereby incorporated by reference into this application.

BACKGROUND OF THE INVENTION

1. Field of the Invention

The present invention relates to a liquid crystal display device, and more particularly, to a technique effectively applied to a liquid crystal display device that is used as a display of a portable electronic device.

2. Description of the Related Art

Liquid crystal display devices are one of devices that have conventionally been used as a display of a portable electronic device such as a cellular phone and a personal digital assistant (PDA).

Liquid crystal display devices are display devices that have a liquid crystal display panel in which a liquid crystal is sealed between a first substrate and a second substrate. The components of the liquid crystal display panel are arranged such that the liquid crystal and the second substrate are nearer to a viewer (person viewing the display panel) than the first substrate.

In a general liquid crystal display device, the first substrate is an insulating substrate, for example, a glass substrate. Scanning signal lines, video signal lines, TFT elements, pixel electrodes, an orientation film, and others are formed on a surface of the first substrate, which is why the first substrate is often called a TFT substrate. The second substrate is an insulating substrate, for example, a glass substrate, and is often called an opposite substrate. Formed on a surface of the second substrate are a light-shielding layer, which divides a display area into pixels, a color filter, an orientation film, and others. Opposite electrodes, which are provided to drive the liquid crystal together with the pixel electrodes, are formed on the opposite substrate side in some cases, and on the TFT substrate side in other cases.

Recent portable electronic devices are ever becoming thinner and lighter, prompting liquid crystal display devices (liquid crystal display panels) and other displays for portable electronic devices to be thinner. One way to obtain a thinner liquid crystal display panel is to reduce the thickness of the insulating substrate (glass substrate) in one or both of the TFT substrate and the opposite substrate.

Another way to obtain a thinner liquid crystal display panel has lately been proposed in which one or both of the TFT substrate and the opposite substrate employ plastic substrates (resin substrates) as insulting substrates instead of glass substrates (see, for example, JP 08-006039 A).

Conventionally, a liquid crystal display device used in a cellular phone or other portable electronic devices is often built inside a casing (exterior parts) of the portable electronic device which has an opening in a portion corresponding to a display area of the liquid crystal display panel. The opening in the casing is, in most cases, covered with a protective cover made of acrylic resin or the like in order to protect the liquid crystal display panel. This structure is beginning to make further thickness reduction of the display part of a cellular phone difficult, and has problems such as lowered visibility of displayed video or images due to a layer of air between the liquid crystal display panel and the protective cover.

A solution for making it possible to further reduce the thickness of a liquid crystal display device for cellular phones and the like while preventing the visibility of displayed images or the like from dropping has been proposed in which a resin plate functioning as the protective cover is attached to a face of the liquid crystal display panel that faces the viewer. The resin plate is attached to the liquid crystal display panel, by attaching the resin plate to a polarization plate that is nearer to the viewer than the opposite substrate (second substrate) with, for example, an adhesive or bonding material so that the resin plate and the polarization plate are in close contact with each other.

Attaching the resin plate to the polarization plate with an adhesive or bonding material has a problem in that, if the adhesive or bonding material is the same acrylic resin-based adhesive or bonding material that is used to attach an upper polarization plate to an insulating substrate (glass substrate) constituting the opposite substrate, the adhesion of the adhesive or bonding material to the resin plate is weak and the resin plate becomes easily detached.

SUMMARY OF THE INVENTION

The present invention has been made in view of the above, and an object of the present invention is therefore to provide a technique of making a resin plate (protective cover) which is attached to a polarization plate of a liquid crystal display panel with an adhesive or bonding material hard to become detached.

The aforementioned and other objects and novel features of the present invention will become clear by reading this specification in conjunction with the accompanying drawings.

Representative aspects of the present invention disclosed herein are outlined as follows:

(1) A liquid crystal display device, including: a first substrate; a second substrate which is placed nearer to a viewer (person viewing the liquid crystal display device) than the first substrate, and which faces a viewer side of the first substrate; a liquid crystal sandwiched between the first substrate and the second substrate; an upper polarization plate which is placed nearer to the viewer than the second substrate, and which faces a viewer side of the second substrate; and a transparent resin plate which is placed nearer to the viewer than the upper polarization plate, and which is attached to a viewer side of the upper polarization plate with one of an adhesive material and a bonding material, in which the transparent resin plate includes a transparent oxide film on a face that faces the upper polarization plate, and the transparent resin plate is in close contact with the one of the adhesive material and the bonding material through the transparent oxide film;

(2) A liquid crystal display device according to the item (1), in which the transparent resin plate is made of acrylic resin, and the one of the adhesive material and the bonding material is acrylic resin same as or different from the acrylic resin of the transparent resin plate;

(3) A liquid crystal display device according to the item (1) or (2), in which the transparent oxide film has conductivity;

(4) A liquid crystal display device according to the item (3), in which the transparent oxide film having the conductivity is connected to a conductive layer of fixed electric potential;

(5) A liquid crystal display device according to any one of the items (1) to (4), in which the first substrate includes a pixel electrode, which drives the liquid crystal together with an opposite electrode, and the second substrate includes the opposite electrode, which drives the liquid crystal together with the pixel electrode;

(6) A liquid crystal display device according to any one of the items (1) to (4), in which the first substrate includes both of a pixel electrode and an opposite electrode which together drive the liquid crystal;

(7) A liquid crystal display device according to the item (6), in which the second substrate includes on its viewer side a conductive layer that is electrically insulated from the pixel electrode and the opposite electrode;

(8) A liquid crystal display device according to any one of the items (1) to (7), in which an outline of faces of the transparent resin plate and the transparent oxide film that face the upper polarization plate is outside an outline of a face of the upper polarization plate that faces the transparent oxide film; and (9) A liquid crystal display device according to any one of the items (1) to (8), in which a viewer side of the transparent resin plate has a surface pencil hardness of 3H or more.

In the liquid crystal display device according to the present invention, the resin plate (protective cover) which is attached to the upper polarization plate with the adhesive or bonding material can be made hard to become detached.

DETAILED DESCRIPTION OF THE INVENTION

The present invention will be described in detail below through an embodiment with reference to the drawings.

Throughout the drawings illustrating the embodiment, components having the same function are denoted by the same reference symbol in order to avoid repetitive description.

FIGS. 1A and 1B and FIGS. 2A and 2B are schematic diagrams outlining a conventional liquid crystal display device and a liquid crystal display device according to the present invention, respectively.

Figure 1A:
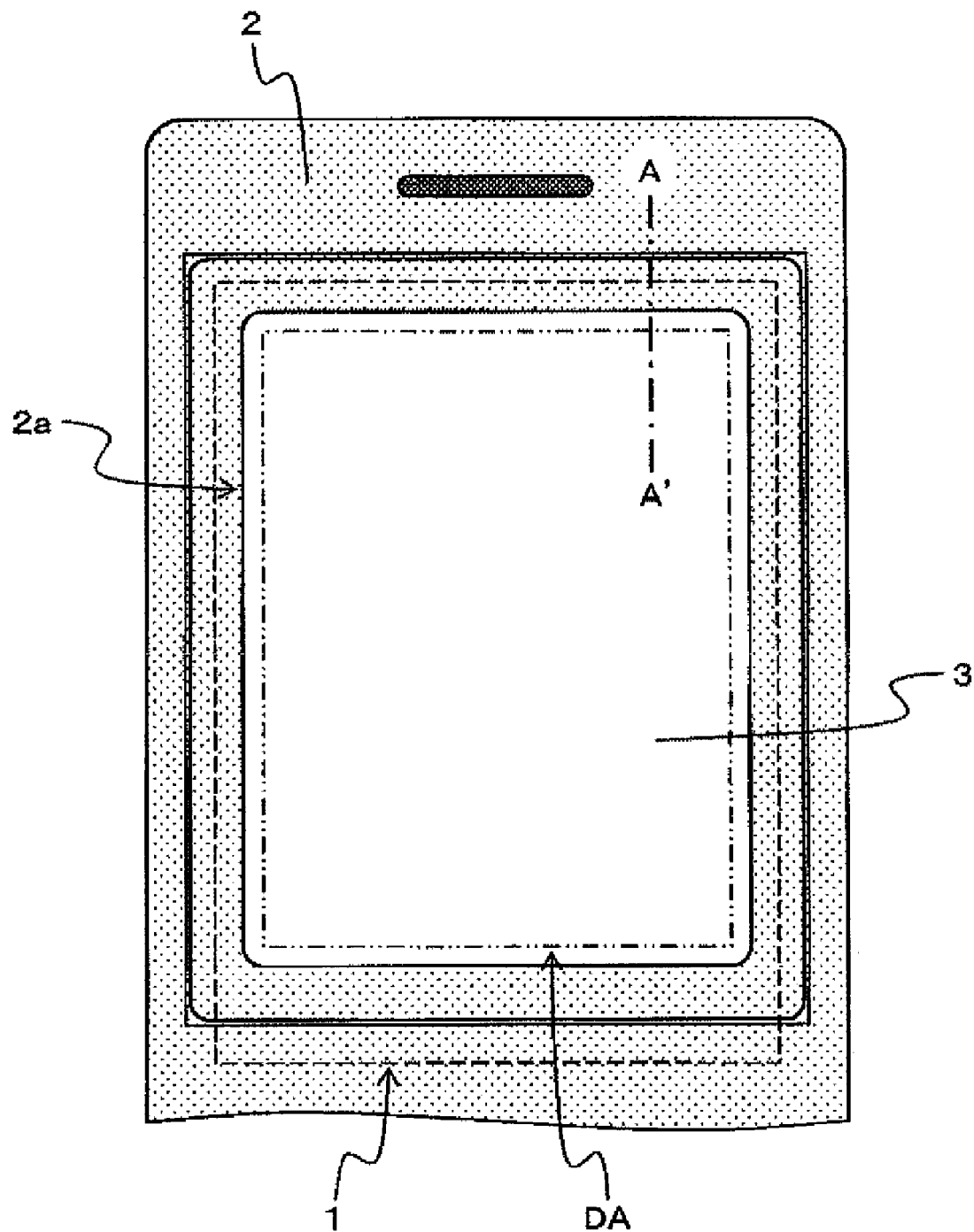
FIG. 1A is a schematic plan view showing an example of the schematic structure of a display part in a conventional cellular phone.
Figure 1B:
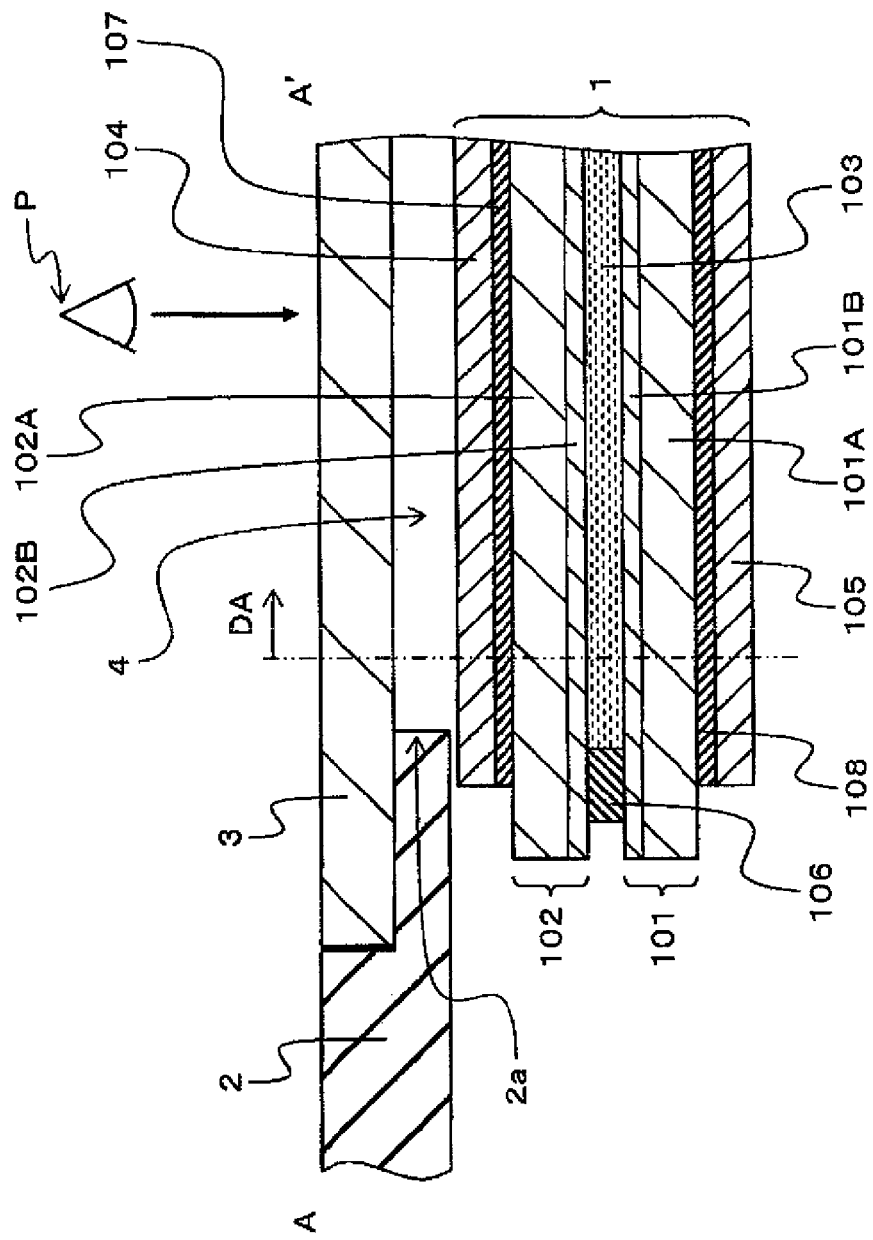
FIG. 1B is a schematic sectional view taken along the line A-A' of FIG. 1A.

FIG. 1A is a schematic plan view showing an example of the schematic structure of a display part in a conventional cellular phone. FIG. 1B is a schematic sectional view taken along the line A-A' of FIG. 1A.

Figure 2A:
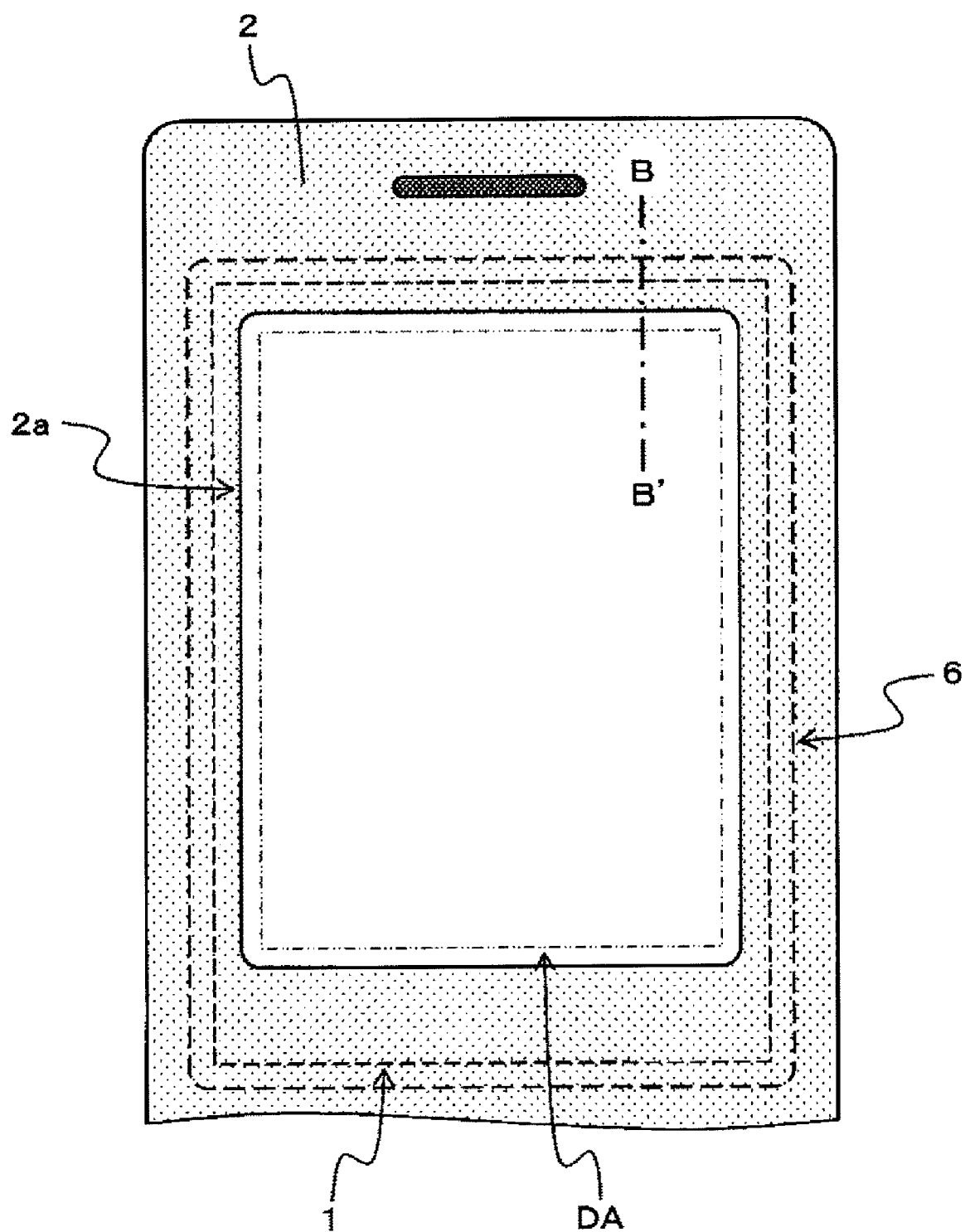
FIG. 2A is a schematic plan view showing an example of the schematic structure of a display part in a cellular phone that has a liquid crystal display device according to the present invention.
Figure 2B:
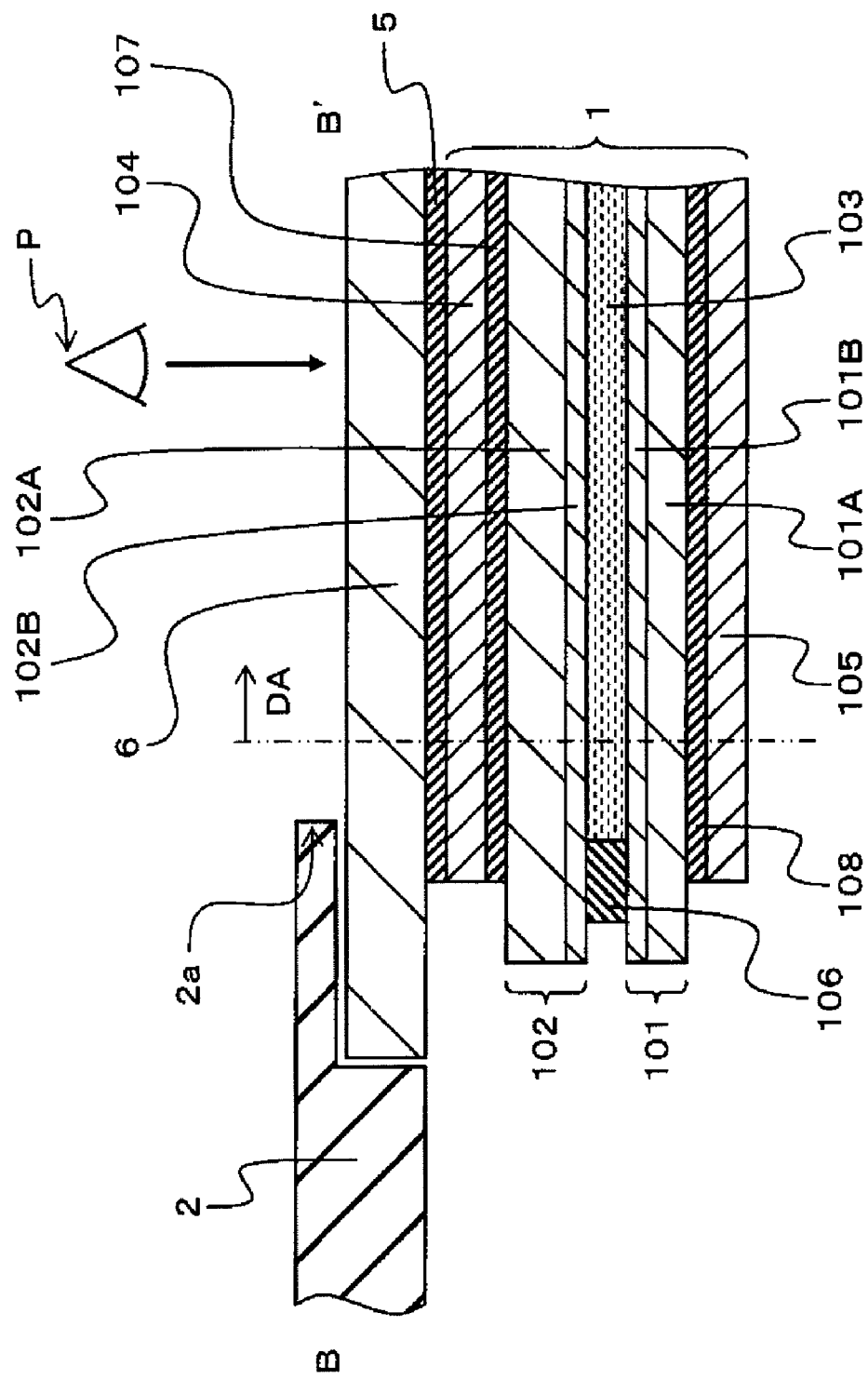
FIG. 2B is a schematic sectional view taken along the line B-B' of FIG. 2A.

FIG. 2A is a schematic plan view showing an example of the schematic structure of a display part in a cellular phone that has a liquid crystal display device according to the present invention. FIG. 2B is a schematic sectional view taken along the line B-B' of FIG. 2A.

FIG. 1B shows only a part of the sectional structure cut along the line A-A' of FIG. 1A, and contains no components other than a liquid crystal display panel, a protective cover, and a casing. FIG. 2B shows only a part of the sectional structure cut along the line B-B' of FIG. 2A, and contains no components other than a liquid crystal display panel, a protective cover, and a casing. In FIGS. 1B and 2B, dimensional (particularly thickness) relations among components are not true to dimensional relations in an actual liquid crystal display panel and are modified such that the structure is easily understood.

The structure of a display part in a general conventional cellular phone is, for example, as the structure shown in FIGS. 1A and 1B, where a liquid crystal display device (also called a liquid crystal display module) having a liquid crystal display panel 1 is built inside a casing (exterior part) 2 with an opening formed in a portion that overlaps a display area DA. The opening in the casing 2 is denoted by 2a, and a protective cover 3 formed of transparent resin, for example, acrylic resin, is fit to an opening 2a.

The liquid crystal display panel 1 has, for example, a first substrate 101, a second substrate 102, which is placed on the viewer side (the near side from a viewer P) to be nearer to the viewer P than the first substrate 101, a liquid crystal 103, which is sandwiched between the first substrate 101 and the second substrate 102, an upper polarization plate 104, which is placed on the viewer side (the near side from the viewer P) to be nearer to the viewer P than the second substrate 102, and a lower polarization plate 105, which is placed behind the first substrate 101 when viewed from the viewer P.

The first substrate 101 includes an insulating substrate 101A, which is a glass substrate or the like, and a thin film laminate 101B, which is formed on a face of the insulating substrate 101A that faces the second substrate 102. The first substrate 101 is a substrate that is generally called as a TFT substrate. The thin film laminate 101B of the first substrate 101 is obtained by layering, for example, a conductive layer, an insulating layer, and a semiconductor layer. Formed on the thin film laminate 101B are scanning signal lines, video signal lines, TFTs, pixel electrodes, an orientation film, and the like. Hereinafter, the first substrate 101 is referred to as TFT substrate.

Similarly, the second substrate 102 includes an insulating substrate 102A, which is a glass substrate or the like, and a thin film laminate 102B, which is formed on a face of the insulating substrate 102A that faces the first substrate 101. The second substrate 102 is a substrate that is generally called as an opposite substrate. The thin film laminate 102B of the second substrate 102 is obtained by layering, for example, a conductive layer and an insulating layer. Formed on the thin film laminate 102B are a light-shielding film, a color filter, an orientation film, and the like. The second substrate 102 is hereinafter referred to as opposite substrate.

Opposite electrodes, which are provided to drive the liquid crystal together with the pixel electrodes, are formed in the thin film laminate 102B of the opposite substrate 102 in some cases, and in the thin film laminate 101B of the TFT substrate 101 in other cases.

The TFT substrate 101 and the opposite substrate 102 are attached to each other with a ring-shaped sealing member 106, which surrounds the display area DA. The liquid crystal 103 is sealed in a space enclosed by the TFT substrate 101, the opposite substrate 102, and the sealing member 106.

The upper polarization plate 104 is attached to the insulating substrate 102A of the opposite substrate 102 with, for example, a first adhesive material 107. Similarly, the lower polarization plate 105 is attached to the insulating substrate 101A of the TFT substrate 101 with, for example, a second adhesive material 108. The first adhesive material 107 and the second adhesive material 108 are usually selected to suit the materials of the insulating substrates 101A and 102A and the materials of the polarization plates 104 and 105, so that enough adhesion is obtained. In the general liquid crystal display panel 1, when the insulating substrates 101A and 102A are glass substrates and the polarization plates 104 and 105 are TAC films, an acrylic resin-based adhesive material, for example, is used as the first adhesive material 107 and the second adhesive material 108.

A first bonding material may replace the first adhesive material 107 in attaching the upper polarization plate 104 to the insulating substrate 102A of the opposite substrate 102. A second bonding material may replace the second adhesive material 108 in attaching the lower polarization plate 105 to the insulating substrate 101A of the TFT substrate 101. The first bonding material and the second bonding material are, for example, a photo-curing (e.g., ultraviolet-curable), or heat-curable, acrylic resin-based bonding material when the insulating substrates 101A and 102A are glass substrates and the polarization plates 104 and 105 are TAC films as in the case where the adhesive materials 107 and 108 are employed instead.

The liquid crystal display panel 1 (liquid crystal display device) that places the lower polarization plate 105 behind the TFT substrate 101 from the perspective of the viewer P as shown in FIG. 1B is of a transmissive or semi-transmissive type, and a backlight unit (light source), a light diffusion plate, and the like are disposed behind the liquid crystal display panel 1 from the perspective of the viewer P. The liquid crystal display panel 1 (liquid crystal display device) of a reflective type usually does not need the lower polarization plate 105.

When the display part of a cellular phone is structured as shown in FIGS. 1A and 1B, there is an air layer 4 between the upper polarization plate 104 of the liquid crystal display panel 1 and the protective cover 3. The air layer 4 could lower the visibility of displayed video or images. In addition, warping of the liquid crystal display panel 1 and breaking of the liquid crystal display panel 1 before encasement in the casing 2 have to be avoided by securing enough strength by forming the insulating substrate 101A of the TFT substrate 101 and the insulating substrate 102A of the opposite substrate 102 thick. This is beginning to make further thickness reduction of liquid crystal display devices difficult.

FIGS. 2A and 2B show an example of proposed solutions for making it possible to further reduce the thickness of a liquid crystal display device for cellular phones and the like while keeping the visibility of displayed images. As shown in FIGS. 2A and 2B, a resin plate 6 is attached to the upper polarization plate 104 of the liquid crystal display panel 1 with a third adhesive material 5. The resin plate 6 is formed of transparent resin with high light transmittance, such as acrylic resin (for example, PMMA) It is particularly desirable if the resin plate 6 is formed of such resin that the viewer side of the resin plate 6 has a surface pencil hardness of 3H or more. The surface pencil hardness is a surface hardness based on the result of the pencil hardness test (JIS standard G0202), and having a surface pencil hardness of 3H or more means that drawing lines on a surface of the resin plate 6 with a 3H pencil or a pencil softer than 3H does not leave a scratch on the surface of the resin plate 6. The resin plate 6 itself may be formed of a resin material that has a surface pencil hardness of 3H or more, or a surface of the resin plate 6 may receive hard coat treatment to reach a surface pencil hardness of 3H or more.

The resin plate 6 thus assumes the function of the protective cover 3, and avoids the lowering of visibility which is observed in a structure as the one shown in FIG. 1B due to the air layer 4 between the upper polarization plate 104 of the liquid crystal display panel 1 and the protective cover 3.

Another advantage is that attaching the resin plate 6 to the liquid crystal display panel 1 reinforces the liquid crystal display panel 1, thereby making it possible to further reduce the thickness of the insulating substrate 101A of the TFT substrate 101, in other words, the thickness of the liquid crystal display panel 1. The resin plate 6 also enables the display part of the above-mentioned cellular phone or the like to be thinner by eliminating the air layer 4.

To keep the manufacture cost from rising by applying an existing material, the third adhesive material 5 (or third bonding material) is desirably the same adhesive material (or bonding material) as the first adhesive material 107 and the second adhesive material 108 (or the first bonding material and the second bonding material). However, if the third adhesive material 5 is the same acrylic resin-based adhesive material that is used as the first adhesive material 107 and the second adhesive material 108 in the general liquid crystal display panel 1, the adhesion between the resin plate 6 and the third adhesive material 5 is weaker than the adhesion between the upper polarization plate 104 and the third adhesive material 5, the adhesion between the insulating substrate 102A (glass substrate) of the opposite substrate 102 and the first adhesive material 107, and the like. This makes the resin plate 6 easy to become detached, and the same applies to a case where a bonding material is employed instead of an adhesive material.

In the following embodiment, a description is given on an example of a structure for making the resin plate 6, which is attached to the upper polarization plate 104 of the liquid crystal display panel 1 with the third adhesive material 5 (or third bonding material) as in the structure of FIG. 2B, hard to become detached.

Figure 3A:
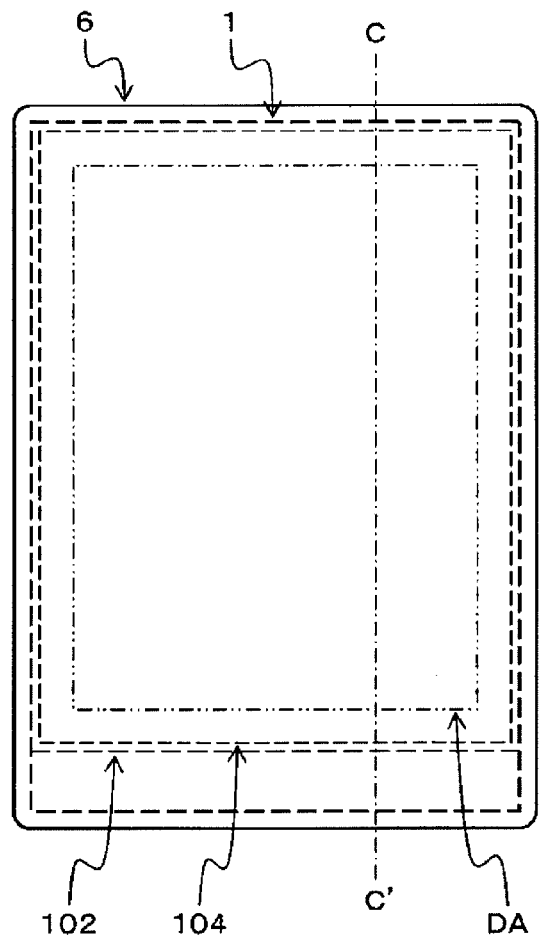
FIG. 3A is a schematic plan view showing an example of the schematic structure of a liquid crystal display device according to an embodiment of the present invention.
Figure 3B:
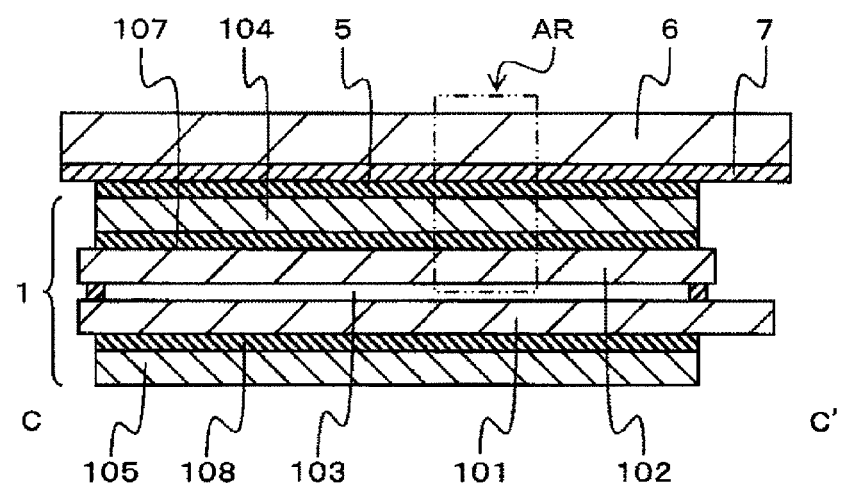
FIG. 3B is a schematic sectional view taken along the line C-C' of FIG. 3A.

FIGS. 3A and 3B are schematic diagrams showing the schematic structure of the liquid crystal display device according to an embodiment of the present invention.

FIG. 3A is a schematic plan view showing an example of the schematic structure of the liquid crystal display device of this embodiment. FIG. 3B is a schematic sectional view taken along the line C-C' of FIG. 3A.

FIGS. 3A and 3B show only the liquid crystal display panel and the resin plate attached to the liquid crystal display panel out of the components of the liquid crystal display device. In FIG. 3B, an upper side of the liquid crystal display panel 1 is the viewer side. In FIG. 3B, dimensional (particularly thickness) relations among components are not true to the dimensional relations in the actual liquid crystal display panel and are modified such that the structure is easily understood.

The liquid crystal display device of this embodiment uses the third adhesive material 5 to attach the resin plate 6 (for example, PMMA) to the viewer side of the upper polarization plate 104 of the liquid crystal display panel 1 as shown in FIGS. 3A and 3B, for instance. The resin plate 6 has an oxide film 7, which is formed on a face of the resin plate 6 that faces the upper polarization plate 104 and which is in close contact with the third adhesive material 5. In other words, the resin plate 6 is in close contact with the third adhesive material 5 through the oxide film 7.

The oxide film 7 may be any oxide film as long as it is transparent at high light transmittance. For example, the oxide film 7 may be an insulating oxide film such as a silicon oxide ($SiO_2$) film, or a transparent conductive oxide film such as an ITO film or an IZO film that forms the pixel electrodes and the opposite electrodes.

When the liquid crystal display panel 1 is of a lateral electric field driving type, which means that the pixel electrodes and opposite electrodes for driving the liquid crystal 103 are formed in the thin film laminate 101B of the TFT substrate 101, an ITO film is often formed as a static electricity-shielding film on a face of the insulating substrate 102A of the opposite substrate 102 that faces the upper polarization plate 104. In this case, the upper polarization plate 104 attached to the opposite substrate 102 with, for example, an acrylic resin-based adhesive material as the first adhesive material 107 rarely becomes detached. This indicates that the adhesion between the oxide film 7 such as an ITO film and an acrylic resin-based adhesive material (or bonding material) is strong and exceeds the adhesion between the resin plate 6 (acrylic resin plate) and the acrylic resin-based adhesive material (or bonding material).

The resin plate 6 is thus made hard to become detached by forming the oxide film 7 on a surface of the resin plate 6 and bringing the oxide film 7 into close contact with the third adhesive material 5 (or third bonding material).

A silicon oxide film is an oxide film used as, for example, an insulating layer that has the function of a gate insulating film of a TFT in the thin film laminate 101B of the TFT substrate 101. An ITO film and an IZO film are conductive oxide films used for the pixel electrodes and the opposite electrodes in the thin film laminate 101B of the TFT substrate 101 and the thin film laminate 102B of the opposite substrate 102. When one of these films is the oxide film 7, the oxide film 7 is high in light transmittance and accordingly can prevent the visibility of displayed video or images from dropping.

Figure 4A:
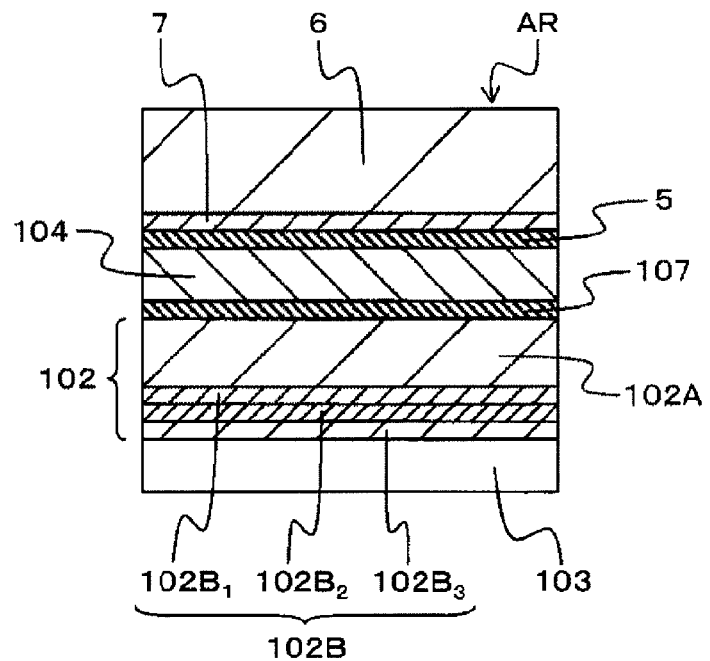
FIG. 4A is a schematic sectional view showing a first structural example of an area AR of FIG. 3B.
Figure 4B:
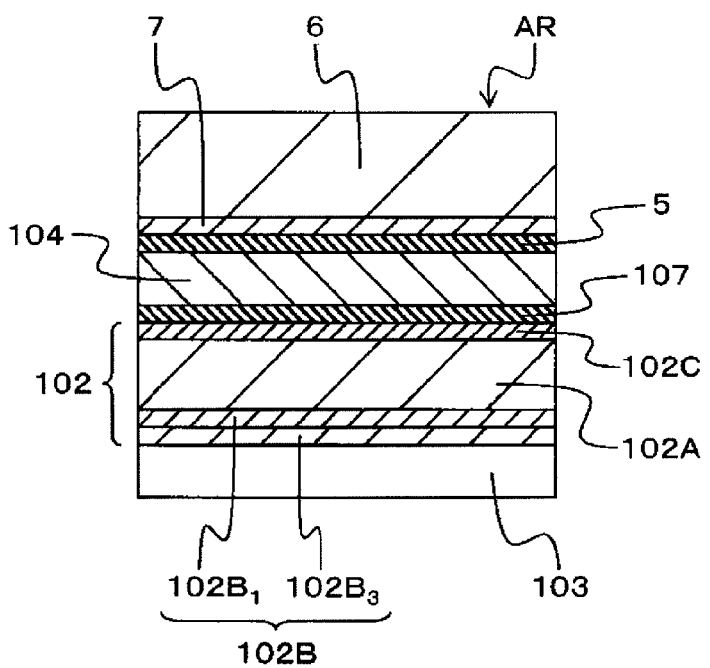
FIG. 4B is a schematic sectional view showing a second structural example of the area AR of FIG. 3B.
Figure 4C:
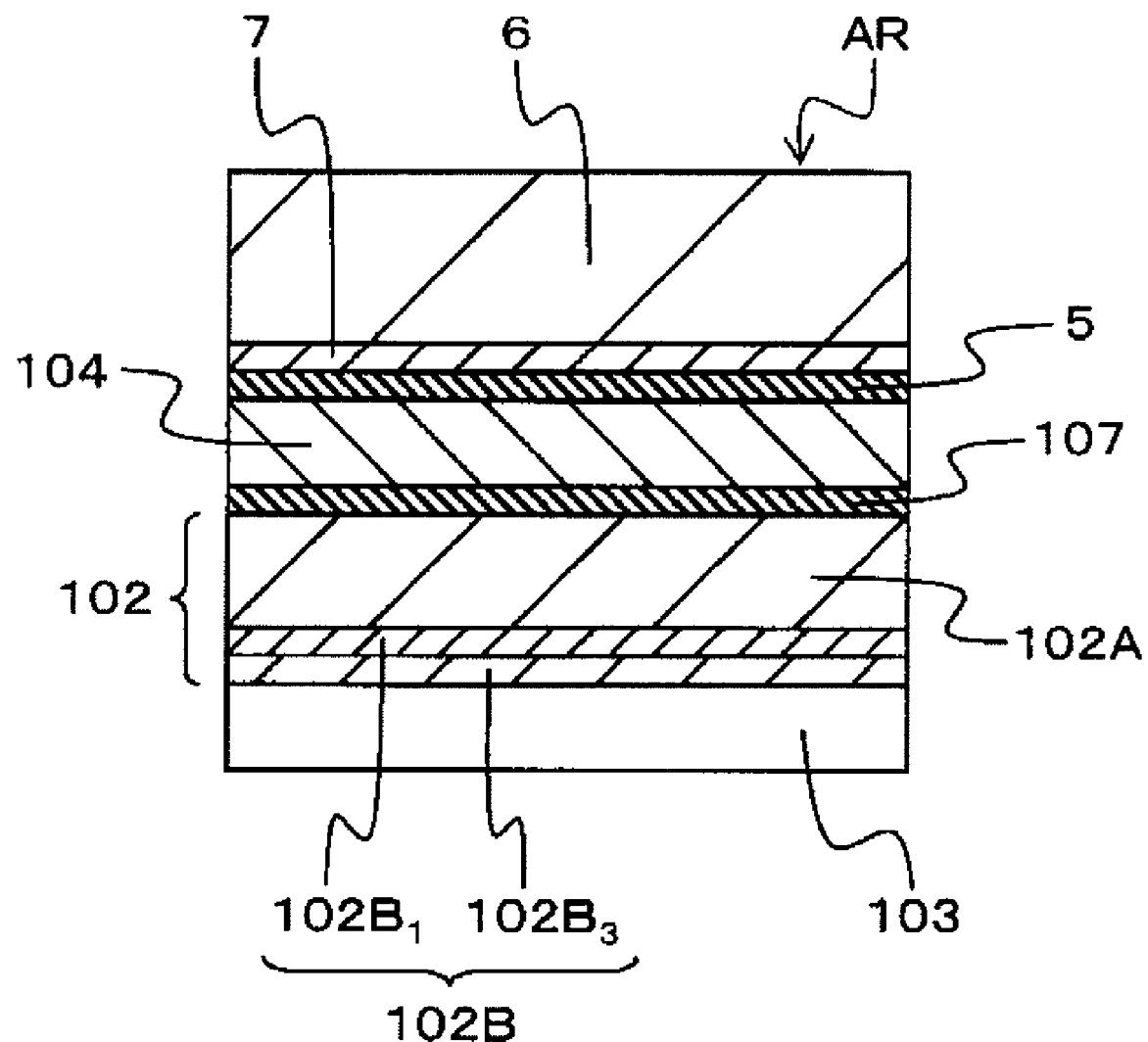
FIG. 4C is a schematic sectional view showing a third structural example of the area AR of FIG. 3B.

FIGS. 4A through 4C are schematic diagrams illustrating specific structural examples in terms of the liquid crystal display panel and the resin plate of this embodiment.

FIG. 4A is a schematic sectional view showing a first structural example of an area AR of FIG. 3B. FIG. 4B is a schematic sectional view showing a second structural example of the area AR of FIG. 3B. FIG. 4C is a schematic sectional view showing a third structural example of the area AR of FIG. 3B.

In FIGS. 4A through 4C, dimensional (particularly thickness) relations among components are not true to the dimensional relations in the actual liquid crystal display panel and are modified such that the structure is easily understood.

In the liquid crystal display device of this embodiment, the opposite electrodes which, along with the pixel electrodes, drive the liquid crystal 103 may be formed in either the thin film laminate 102B of the opposite substrate 102 or the thin film laminate 101B of the TFT substrate 101. Descriptions are given below on a specific structural example in terms of the structure of the opposite substrate 102 and the material of the oxide film 7 when the opposite electrodes are formed in the thin film laminate 102B of the opposite substrate 102 and a specific structural example in terms of the structure of the opposite substrate 102 and the material of the oxide film 7 when the opposite electrodes are formed in the thin film laminate 101B of the TFT substrate 101.

Described first is a specific structural example in terms of the structure of the opposite substrate 102 and the material of the oxide film 7 when the opposite electrodes are formed in the thin film laminate 102B of the opposite substrate 102. The thin film laminate 102B of the opposite substrate 102 in this case is structured, for example, as shown in FIG. 4A. A thin film laminate layer $102B_1$ is formed on a face of the insulating substrate (glass substrate) 102A that faces the liquid crystal 103 (TFT substrate 101). The thin film laminate layer $102B_1$ has a light-shielding film, a color filter, and a planarizing film. An opposite electrode $102B_2$ and an orientation film $102B_3$ are layered on the thin film laminate layer $102B_1$ when viewed from the insulating substrate 102A.

The back of the face of the insulating substrate 102A that faces the liquid crystal 103 (TFT substrate 101), in other words, the viewer side of the insulating substrate 102A, has the upper polarization plate 104 attached thereto with the first adhesive material 107. The upper polarization plate 104 in the example of FIG. 4A is attached directly to the insulating substrate 102A. Alternatively, a single-layer or multi-layer phase difference plate may be interposed between the insulating substrate 102A and the upper polarization plate 104.

The resin plate 6 having the oxide film 7 is attached to the viewer side of the upper polarization plate 104 with the third adhesive material 5.

The opposite electrode $102B_2$ in the thin film laminate 102B of the opposite substrate 102 is formed of, for example, a conductive film such as an ITO film, which is generally formed all over the thin film laminate layer $102B_1$. The opposite electrode $102B_2$ in the thus structured liquid crystal display panel 1 has the function of a static electricity shield. When the oxide film 7, which is formed on the resin plate 6 and which may be either an insulating oxide film (for example, silicon oxide film) or a conductive oxide film (for example, ITO film), is a conductive oxide film, the effect of shielding against static electricity also appears in the oxide film 7, which enhances the static electricity-shielding effect.

Described next is a specific structural example in terms of the structure of the opposite substrate 102 and the material of the oxide film 7 when the opposite electrodes are formed in the thin film laminate 101B of the TFT substrate 101. The thin film laminate 102B of the opposite substrate 102 in this case is structured, for example, as shown in FIG. 4B. The thin film laminate layer $102B_1$ is formed on a face of the insulating substrate (glass substrate) 102A that faces the liquid crystal 103 (TFT substrate 101). The thin film laminate layer $102B_1$ has a light-shielding film, a color filter, and a planarizing film. The orientation film $102B_3$ is then laid on the thin film laminate layer $102B_1$ when viewed from the insulating substrate 102A.

On the back of the face of the insulating substrate 102A that faces the liquid crystal 103 (TFT substrate 101), in other words, the viewer side of the insulating substrate 102A, a static electricity-shielding layer 102C is formed of a transparent conductive film such as an ITO film. The upper polarization plate 104 is attached to the top face of the static electricity-shielding layer 102C, viewed from the insulating substrate 102A, with the first adhesive material 107. The upper polarization plate 104 in the example of FIG. 4B is attached directly to the static electricity-shielding layer 102C.

Alternatively, a single-layer or multilayer phase difference plate may be interposed between the static electricity-shielding layer 102C and the upper polarization plate 104.

The resin plate 6 having the oxide film 7 is attached to the viewer side of the upper polarization plate 104 with the third adhesive material 5.

The static electricity-shielding layer 102C of the opposite substrate 102 is, for example, a conductive film such as an ITO film, which is generally formed all over the viewer side of the insulating substrate 102A. When the oxide film 7, which is formed on the resin plate 6 and which may be either an insulating oxide film (for example, silicon oxide film) or a conductive oxide film (for example, ITO film), is a conductive oxide film, the effect of shielding against static electricity also appears in the oxide film 7, which enhances the static electricity-shielding effect.

Another advantage of forming the oxide film 7 on the resin plate 6 from a conductive oxide film and thereby giving the oxide film 7 a static electricity-shielding effect is that it makes providing the opposite substrate 102 with the static electricity-shielding layer 102C an option, not necessity. An example of a structure without the static electricity-shielding layer 102C is shown in FIG. 4C. This simplifies the structure of the opposite substrate 102 and reduces the manufacture cost.

Furthermore, without the static electricity-shielding layer 102C, the insulating substrate 102A can be thinned by forming the thin film laminate layer $102B_1$ and the orientation film $102B_3$ on one face of the insulating substrate 102A and then polishing the other side of the insulating substrate 102A (the back of the face of the insulating substrate 102A where the thin film laminate layer $102B_1$ and the orientation film $102B_3$ are formed), for instance. The opposite substrate 102 can thus be made thinner.

Figure 5A:
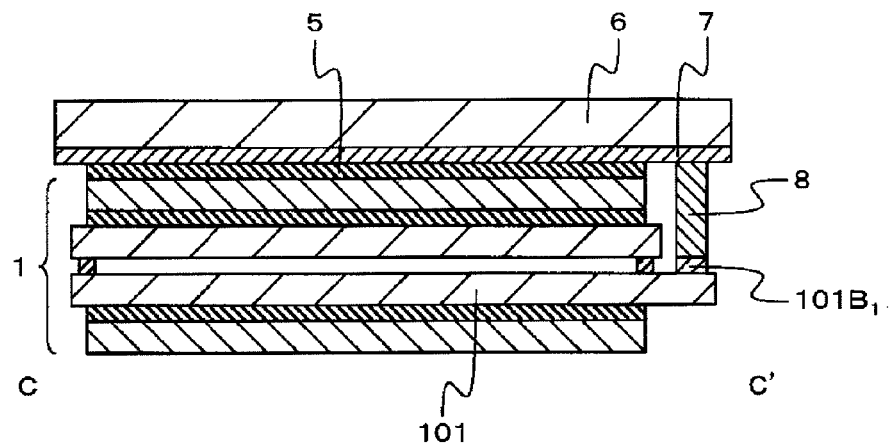
FIG. 5A is a schematic sectional view illustrating an example of a method of enhancing a shielding effect of a conductive oxide film, which is formed on a resin plate.
Figure 5B:
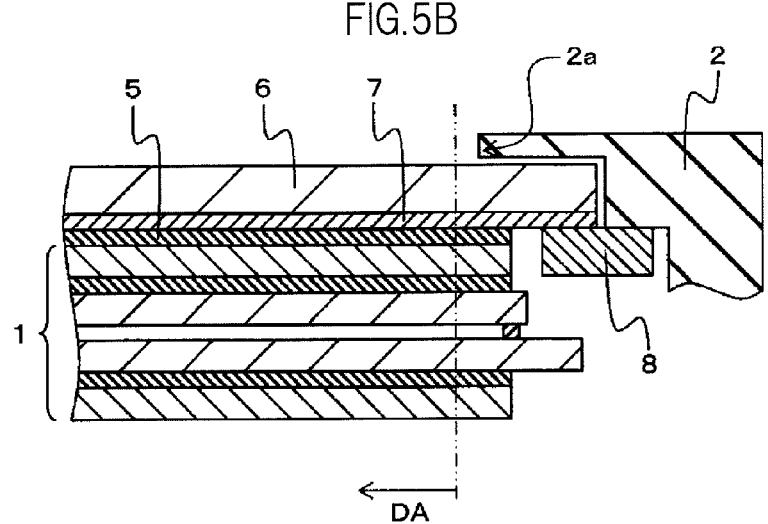
FIG. 5B is a schematic sectional view illustrating another example of the method of enhancing the shielding effect of the conductive oxide film, which is formed on the resin plate.
Figure 5C:
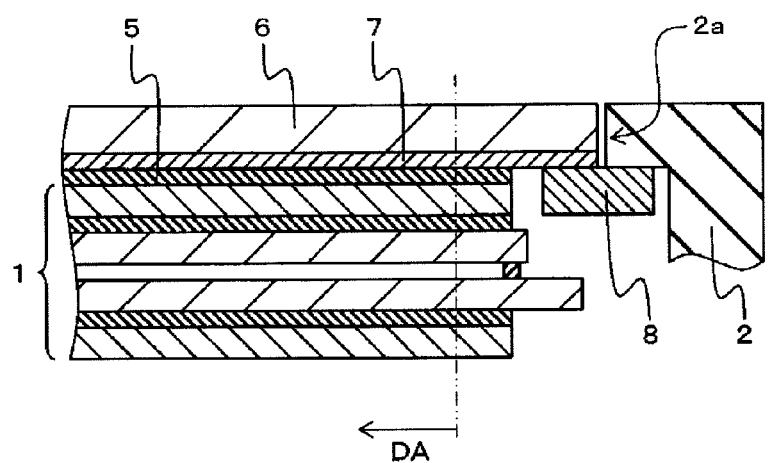
FIG. 5C is a schematic sectional view illustrating a modification example of the example shown in FIG. 5B.

FIGS. 5A through 5C are schematic diagrams illustrating methods of enhancing the shielding effect of a conductive oxide film that is formed on the resin plate in the liquid crystal display device of this embodiment.

FIG. 5A is a schematic sectional view illustrating an example of a method of enhancing the shielding effect of a conductive oxide film formed on the resin plate is enhanced. FIG. 5B is a schematic sectional view illustrating another example of the method of enhancing the shielding effect of a conductive oxide film formed on the resin plate is enhanced. FIG. 5C is a schematic sectional view illustrating a modification example of the example shown in FIG. 5B.

FIGS. 5A through 5C show only a part of the liquid crystal display device, and contain no components other than the liquid crystal display panel, the resin plate, which is attached to the liquid crystal display panel, a conductive layer of fixed electric potential, a conductive member, which connects a conductive oxide film formed on the resin plate and the conductive layer having a fixed electric potential, and the casing (as needed). FIG. 5A corresponds to a sectional view taken along the line C-C' of FIG. 3A. FIGS. 5B and 5C correspond to a part of the sectional view taken along the line C-C' of FIG. 3A, and extract only an area near the point C'. In FIGS. 5A through 5C, dimensional (particularly thickness) relations among components are not true to those in the actual liquid crystal display panel and are modified such that the structure is easily understood.

As described above, forming the oxide film 7 on the resin plate 6 from a conductive oxide film gives the oxide film 7 a static electricity-shielding effect. For example, it is possible for the oxide film 7 in this case to have the static electricity-shielding effect when electrically independent, in other words, when insulated from the conductive layer within the liquid crystal display panel 1, a conductive layer within the casing 2, and the like. However, the static electricity-shielding effect of the oxide film 7 that is a conductive oxide film can be further enhanced by, for example, connecting the oxide film 7 to the conductive layer that has fixed electric potential.

One way to connect the oxide film 7 that has conductivity to the conductive layer that has fixed electric potential is to connect a conductive layer $101B_1$, which is formed on the TFT substrate 101 of the liquid crystal display panel 1, to the oxide film 7 with a conductive member 8. If the conductive layer $101B_1$ is kept at ground potential through, for example, a flexible printed wiring board connected to the liquid crystal display panel 1 (TFT substrate 101), the oxide film 7 is also brought to ground potential and the static electricity-shielding effect is further enhanced. The conductive member 8 may be formed of, for example, conductive resin or conductive rubber, or may be a piece of conductive tape. The conductive member 8 may also be solder or a wire-like conductor.

Alternatively, in the case where the casing (exterior part) 2 which houses the liquid crystal display device is formed of a conductive material, the conductive member 8 may connect the conductive oxide film 7 formed on the resin plate 6 and the casing 2 as shown in FIG. 5B, for instance.

Components that can be connected to the oxide film 7 in order to enhance the static electricity-shielding effect are not limited to the conductive layer $101B_1$ of the TFT substrate 101 and the casing 2 that has conductivity. Though not illustrated in a drawing, the static electricity-shielding effect of the conductive oxide film 7 formed on the resin plate 6 can be enhanced also by electrically connecting the oxide film 7 to conductive parts housed in the casing 2 along with the liquid crystal display panel 1 and the like.

In the example of FIG. 5B, portions of the resin plate 6 and the liquid crystal display panel 1 that are outside the display area DA are covered with the casing 2, but the present invention is not limited to this structure. For example, the portions of the resin plate 6 and the liquid crystal display panel 1 that are outside the display area DA may be exposed as shown in FIG. 5C. The structure of FIG. 5B, however, has additional advantages such as not allowing moisture and foreign objects to easily enter the interior of the casing 2 from a gap between the resin plate 6 and the casing 2, and preventing a drop in visibility due to light seeping from an area outside the display area DA.

FIGS. 6A and 6B and FIGS. 7A and 7B are schematic diagrams respectively illustrating modification examples of the liquid crystal display device of this embodiment.

Figure 6A:
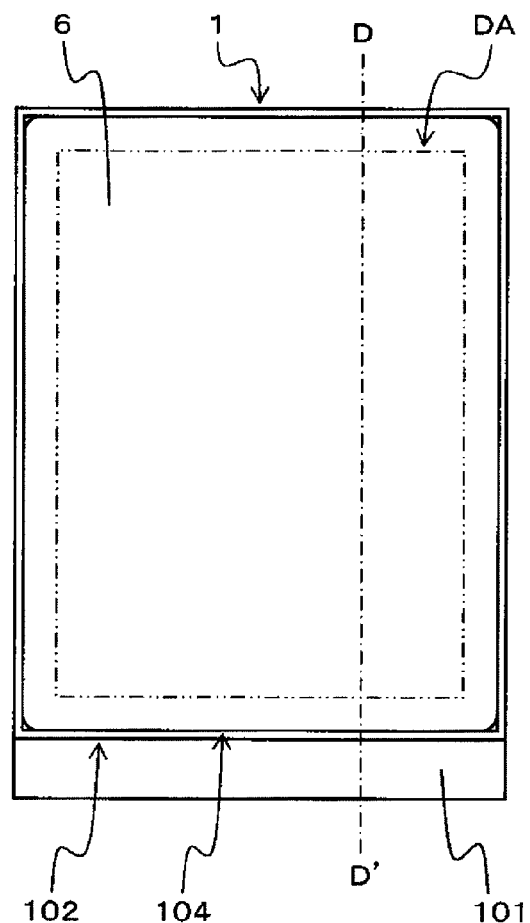
FIG. 6A is a schematic plan view showing a schematic structure of a first modification example of the liquid crystal display device according to the embodiment.
Figure 6B:
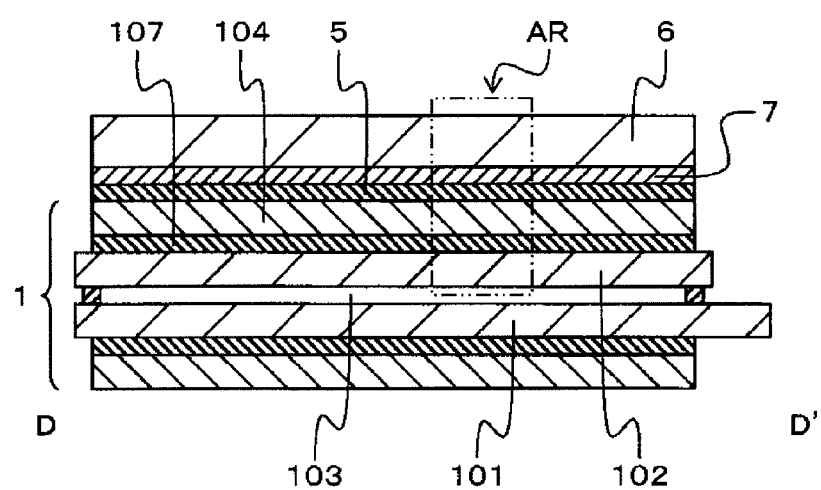
FIG. 6B is a schematic sectional view taken along the line D-D' of FIG. 6A.

FIG. 6A is a schematic plan view showing the schematic structure of a first modification example of the liquid crystal display device of this embodiment. FIG. 6B is a schematic sectional view taken along the line D-D' of FIG. 6A.

Figure 7A:
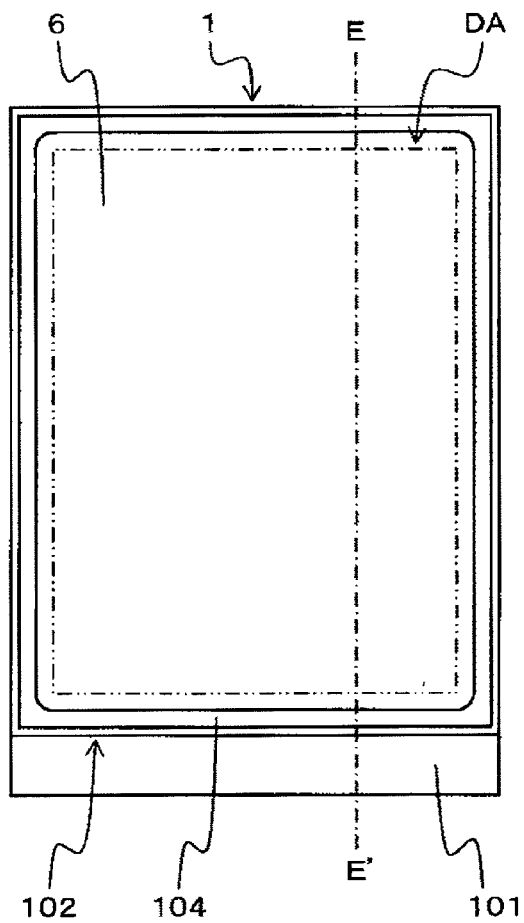
FIG. 7A is a schematic plan view showing a schematic structure of a second modification example of the liquid crystal display device according to the embodiment.
Figure 7B:
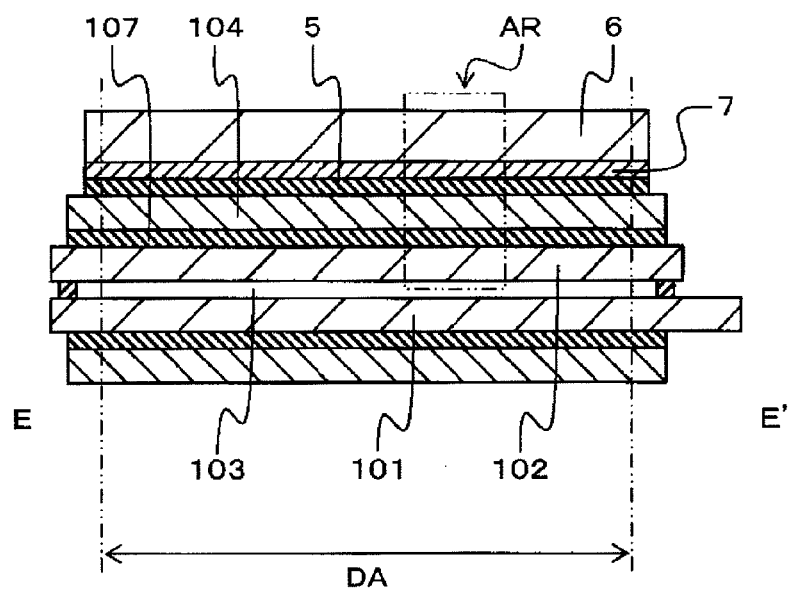
FIG. 7B is a schematic sectional view taken along the line E-E' of FIG. 7A.

FIG. 7A is a schematic plan view showing the schematic structure of a second modification example of the liquid crystal display device of this embodiment. FIG. 7B is a schematic sectional view taken along the line E-E' of FIG. 7A.

FIGS. 6A and 6B and FIGS. 7A and 7B show only a part of the liquid crystal display device, specifically, the structures of the liquid crystal display panel 1 and the resin plate 6 attached to the liquid crystal display panel 1. In FIGS. 6B and 7B, dimensional (thickness) relations among components are not true to the dimensional relations in the actual liquid crystal display panel and are modified such that the structure is easily understood.

A characteristic feature of the liquid crystal display device of this embodiment is that, when an acrylic resin-based adhesive material (or bonding material), for example, is used as the third adhesive material 5 (or third bonding material) to attach the resin plate 6 to the upper polarization plate 104 of the liquid crystal display panel 1, the resin plate 6 is attached by forming the oxide film 7 on a surface of the resin plate 6 in advance and then bringing the oxide film 7 into close contact with the third adhesive material 5. In other words, the important point in the liquid crystal display device of this embodiment is that the oxide film 7 is formed on a face of the resin plate 6 that faces the upper polarization plate 104.

With this in mind, in the first modification example of the liquid crystal display device of this embodiment, the outline of faces of the resin plate 6 and the oxide film 7 that face the upper polarization plate 104 when viewed from the viewer P substantially coincides with the outline of the viewer side of the upper polarization plate 104 as shown in FIGS. 6A and 6B. The specific sectional structure of the area AR of FIG. 6B may be any of the structures shown in FIGS. 4A through 4C.

In the second modification example of the liquid crystal display device of this embodiment, the outline of faces of the resin plate 6 and the oxide film 7 that face the upper polarization plate 104 when viewed from the viewer P falls between the outline of the viewer side of the upper polarization plate 104 and the outline of the display area DA as shown in FIGS. 7A and 7B. As in FIG. 6B, the specific sectional structure of the area AR in FIG. 7B may be any of the structures shown in FIGS. 4A through 4C.

While there have been described what are at present considered to be certain embodiments of the invention, it will be understood that various modifications may be made thereto, and it is intended that the appended claims cover all such modifications as fall within the true spirit and scope of the invention.

The embodiment described above takes a liquid crystal display device as an example and discusses a structure in which the resin plate 6 with the oxide film 7 formed in advance is attached to the upper polarization plate 104 of the liquid crystal display panel 1 with the third adhesive (or bonding) material 5. However, the present invention is not limited to liquid crystal display devices, and is also applicable to display devices that have display panels other than the liquid crystal display panel 1 as a display panel to which the resin plate 6 doubling as the protective cover 3 is attached (for example, organic EL display devices).

What is claimed is:
1. A liquid crystal display device comprising:
a first substrate;
a second substrate which is placed nearer to a viewer than the first substrate, and which faces a viewer side of the first substrate;
a liquid crystal sandwiched between the first substrate and the second substrate;
an upper polarization plate which is placed nearer to the viewer than the second substrate, and which faces a viewer side of the second substrate; and
a transparent resin plate which is placed nearer to the viewer than the upper polarization plate, and which is attached to a viewer side of the upper polarization plate with one of an adhesive material and a bonding material;
wherein:
the transparent resin plate includes a transparent oxide film on a face that faces the upper polarization plate;
the transparent resin plate is in close contact with the one of the adhesive material and the bonding material through the transparent oxide film; and
wherein the transparent oxide film on the face of the transparent resin plate that faces the upper polarization plate in which the transparent resin plate is attached to the viewer side of the upper polarizer plate with one of the adhesive material and the bonding material enables adhesive attachment of the transparent resin plate to the upper polarization plate via the transparent oxide film and the one of the adhesive material and the bonding material with a strength sufficient to make detachment of the transparent resin plate from the upper polarization plate different.

2. A liquid crystal display device according to claim 1, wherein the adhesive strength between the transparent resin plate and the one of the adhesive material and the bonding material via the transparent oxide film is not weaker than the adhesive strength of the upper polarization plate and the one of the adhesive material and the bonding material.

3. A liquid crystal display device according to claim 2, wherein:
the transparent resin plate is made of acrylic resin; and
the one of the adhesive material and the bonding material is acrylic resin same as or different from the acrylic resin of the transparent resin plate.

4. A liquid crystal display device according to claim 1, wherein the transparent oxide film has conductivity.

5. A liquid crystal display device according to claim 4, wherein the transparent oxide film having the conductivity is connected to a conductive layer of fixed electric potential.

6. A liquid crystal display device according to claim 1, wherein:
the first substrate includes a pixel electrode, which drives the liquid crystal together with an opposite electrode; and
the second substrate includes the opposite electrode, which drives the liquid crystal together with the pixel electrode.

7. A liquid crystal display device according to claim 1, wherein the first substrate includes both of a pixel electrode and an opposite electrode which together drive the liquid crystal.

8. A liquid crystal display device according to claim 7, wherein the second substrate includes on its viewer side a conductive layer that is electrically insulated from the pixel electrode and the opposite electrode.

9. A liquid crystal display device according to claim 1, wherein an outline of faces of the transparent resin plate and the transparent oxide film that face the upper polarization plate is outside an outline of a face of the upper polarization plate that faces the transparent oxide film.

10. A liquid crystal display device according to claim 1, wherein a viewer side of the transparent resin plate has a surface pencil hardness of 3 H or more.

* * * * *